US008588461B2

(12) United States Patent
Webb et al.

(10) Patent No.: US 8,588,461 B2
(45) Date of Patent: Nov. 19, 2013

(54) ROBUST WATERMARKING FOR DIGITAL MEDIA

(75) Inventors: Jared Webb, Brigham City, UT (US); Rodney Forcade, Orem, UT (US); Christopher Guzman, Middletown, NY (US); Jeffrey Humpherys, Provo, UT (US); C. Shane Reese, Mapleton, UT (US)

(73) Assignee: Brigham Young University, Provo, UT (US)

( * ) Notice: Subject to any disclaimer, the term of this patent is extended or adjusted under 35 U.S.C. 154(b) by 233 days.

(21) Appl. No.: 13/049,543

(22) Filed: Mar. 16, 2011

(65) Prior Publication Data

US 2011/0228971 A1    Sep. 22, 2011

Related U.S. Application Data

(60) Provisional application No. 61/340,761, filed on Mar. 22, 2010.

(51) Int. Cl.
*G06K 9/00* (2006.01)
*G06K 9/40* (2006.01)

(52) U.S. Cl.
USPC .......................................... 382/100; 382/260

(58) Field of Classification Search
USPC ........................................ 382/100, 103, 260
See application file for complete search history.

(56) References Cited

U.S. PATENT DOCUMENTS

| 6,512,836 | B1 |   | 1/2003 | Xie et al. |
| 6,768,807 | B1 | * | 7/2004 | Muratani ................... 382/100 |
| 7,006,663 | B2 | * | 2/2006 | Acharya et al. ............. 382/100 |
| 7,346,776 | B2 |   | 3/2008 | Levy et al. |
| 7,428,639 | B2 |   | 9/2008 | Demos |
| 7,546,467 | B2 |   | 6/2009 | Lemma et al. |
| 7,554,699 | B2 |   | 6/2009 | Wang et al. |
| 7,570,782 | B2 |   | 8/2009 | Seroussi et al. |
| 2002/0120849 | A1 |   | 8/2002 | McKinley et al. |
| 2003/0070075 | A1 | * | 4/2003 | Deguillaume et al. ........ 713/176 |
| 2008/0002908 | A1 | * | 1/2008 | Chinen et al. ................. 382/274 |
| 2008/0130883 | A1 | * | 6/2008 | Agaian et al. .................. 380/54 |

FOREIGN PATENT DOCUMENTS

EP          1615434 A1     1/2006

OTHER PUBLICATIONS

Arnold, et al., "Real-time concepts for block-based watermarking schemes", Proceedings of Second International Conference on Web Delivering of Music, Dec. 9, 2002, pp. 156-160.
Fiat, et al., "Dynamic Traitor Tracing", Journal of Cryptology, vol. 14, 2001, pp. 211-223.
Thanos, "COiN-Video: A Model for the Commercialization of Video Streams Over Open Networks", Working paper, Trusted Objects, Technical Report, Jul. 1999, pp. 25-34.

* cited by examiner

*Primary Examiner* — Bernard Krasnic
*Assistant Examiner* — Weiwen Yang

(57) ABSTRACT

Embedding a watermark includes organizing variation locations in a data stream, partitioning the data stream into small blocks, determining the variation of small blocks based on the variation, categorizing small blocks into big blocks, identifying those big blocks that have a threshold level of variation, and embedding into those identified big blocks a watermark value.

19 Claims, 11 Drawing Sheets

1100 

```
input: Original Image
output: Watermarked Image, Variation Matrix

W_{o} = original image

Calculate W_{d}, the diffused original work.

foreach 8x8 pixel block b in W_{d}
        variationMatrix(b) = calculateVariation(W_{o}(b))

for each block b in W_{o}
        if suitabilityCheck(b) == true
                v = variationTarget (per pixel)
                for each pixel p in b
                        p = p + v return altered image, variationMatrix
```

*Fig. 11*

1200 

```
function calculateVariation input: A block of pixels, pixelBlock
output: A measurement on the amount of variation found in the block intensityFactor = k
variation = 0 foreach pixel p in pixelBlock
        localVariation = 0
        foreach neighbor n of p
                localVariation += (n.intensity - p.intensity)^intensityFactor
        variation += localVariation
```

*Fig. 12*

```
function suitabilityCheck input      32x32 block
output     true or false blockVariation = 0 foreach 8x8 block b in input
        blockVariation += variationMatrix(b)

if blockVariation > threshold
        return true
else
        return false
```

*Fig. 13*

ROBUST WATERMARKING FOR DIGITAL MEDIA

RELATED APPLICATIONS

The present application is a non-provisional application and claims priority under 35 U.S.C. §119(e) of the previously filed Provisional Patent Application, U.S. Application No. 61/340,761, filed Mar. 22, 2010, by Humpherys, entitled "Robust Watermarking for Digital Media," which application is incorporated herein by reference in its entirety.

BACKGROUND

The advent of the Internet has created new distribution avenues for the communication of digital media such as music, video and still graphics. It has also created an underground network of media pirates. No sooner does a digital work become available for purchase then it becomes available illegally on peer to peer networks. In some cases intellectual property is leaked prior to its official release and made available to an increasingly tech-savvy populace.

As copyright holders have worked within the legal system to protect their interests, networks of media pirates have developed more sophisticated techniques. Such techniques have made theft more widespread and difficult to prosecute. Despite the existence of legitimate avenues for digital distribution (such as iTunes), a significant amount of media downloads are pirated.

Recently, digital watermarking and steganography have been proposed as an effective enforcement mechanism. The aim of digital watermarking is to use information hiding techniques to create an unobtrusive yet robust means to embed ownership information in media that may be subject to unauthorized distribution. In this manner, the media can be located and media pirates can be prosecuted. This is especially relevant during the production phase of new media, where an unauthorized leak can create substantial losses for a movie studio.

For a digital watermark to be considered effective in some embodiments, it needs to meet the following criteria: it must be unobtrusive, robust to intentional and unintentional attempts at removal, and have sufficient capacity for unique watermarks. Creating a watermark that meets these requirements for some embodiments has proven elusive. For instance, previous methods have sought to embed information into coefficients of the frequency domain or the wavelet domain, but there is no guarantee that the embedded regions are critical to the file's integrity.

SUMMARY

One embodiment is directed to a computer system that includes instructions recorded on a non-transitory computer-readable storage medium and readable by at least one processor. The system comprises a first blocking module configured to divide a diffused filestream into a first set of data blocks, wherein each data block comprises a region of the diffused filestream; a variance module configured to calculate the variance of the first set of data blocks; a second blocking module configured to order the first set of data blocks into a second set of data blocks, wherein each data block of the second set comprises one or more data blocks of the first set; a threshold module configured to sum the variance of the second set of data blocks and to select a threshold data block, wherein the threshold data block is a data block within the second set that has a variance at or above a set threshold level;
and a watermarking module configured to embed a watermark in an original filestream from which the diffused filestream was derived and in the same region of the second threshold data block of the diffused filestream.

One embodiment is directed to a computer-implemented method for causing at least one processor to execute instructions recorded on a computer-readable storage medium. The method comprises dividing a diffused filestream into a first set of data blocks, wherein each data block comprises a region of the diffused filestream; calculating the variance of the first set of data blocks; ordering the first set of data blocks into a second set of data blocks, wherein each data block of the second set comprises one or more data blocks of the first set; summing the variance of the second set of data blocks; selecting a threshold data block, wherein the threshold data block is a data block within the second set that has a variance at or above a set threshold level; and embedding a watermark in an original filestream from which the diffused filestream was derived and in the same region of the second threshold data block of the diffused filestream.

BRIEF DESCRIPTION OF THE DRAWINGS

FIG. 11 is a representation of pseudocode that may be used to watermark an image.

FIG. 12 is a representation of pseudocode that may be used to determine variation in a block contained within the first set of data blocks.

FIG. 13 is a representation of pseudocode that may be used to determine which blocks in the second set of data blocks meet or exceed a variation threshold value.

DETAILED DESCRIPTION

The present specification discloses systems and methods for embedding a watermark in a filestream. Such a filestream can include all types of digital media, such as music, video, and still graphics. Recently, digital watermarking and steganography have been proposed as an effective enforcement mechanism to protect copyrighted media. The aim of digital watermarking is to use information hiding techniques to create an unobtrusive yet robust means to embed watermarks and identify unauthorized distribution and prosecute media pirates. This is especially relevant during the production phase of new media, where an unauthorized leak can create substantial losses for a movie studio.

Previous methods have sought to do this by embedding information into coefficients of the frequency domain or the wavelet domain. Certain embodiments presented herein, however, seek to choose regions of a media file based on its local total variation. This is accomplished by smoothing the image and using the result to calculate the watermark, which is then embedded into the original work.

For a digital watermark to be considered effective in certain embodiments, it may benefit from certain criteria. First, it may be unobtrusive, essentially, invisible to the naked eye, inaudible to the ear, and imperceptible to detection methods in general. This enables the user to appreciate the original contents and not be distracted by what could otherwise be deemed an imperfection in the filestream while still providing a valuable tool for copyright holders and others concerned with media rights.

Second, the watermarked filestream may be robust in certain embodiments to intentional and unintentional attempts at removal. Filestreams are often subject to processes that induce distortion, such as cropping, rotating, dithering, compression, recompression, error-prone channels, and other processes. For a filestream with a weak watermark, one or more of these types of processes may readily increase the detectability of the watermark, mar the watermark, or erase the watermark completely, such that it cannot be detected at all. Thus, a robust watermarked filestream in certain embodiments is one in which the watermark will be more likely to withstand one or more of these type of processes.

Third, a sufficient watermark capacity is desirable in certain embodiments. Watermark capacity may be measured by the number of properties that can be altered. For an image, such properties may include color, contrast, tint, precision, brightness, etc. For a musical piece, such properties may include scale, contour, mode, rhythm, interval, dynamics, pitch, etc. Having a multiple number of properties is beneficial in providing a hardy and robust protection. Furthermore, a wide range of variation within those properties is also beneficial because it allows for a wider selection of variation that may be selected as watermark criteria. Embodiments presented herein may observe one or more of these objectives.

Figure 1:
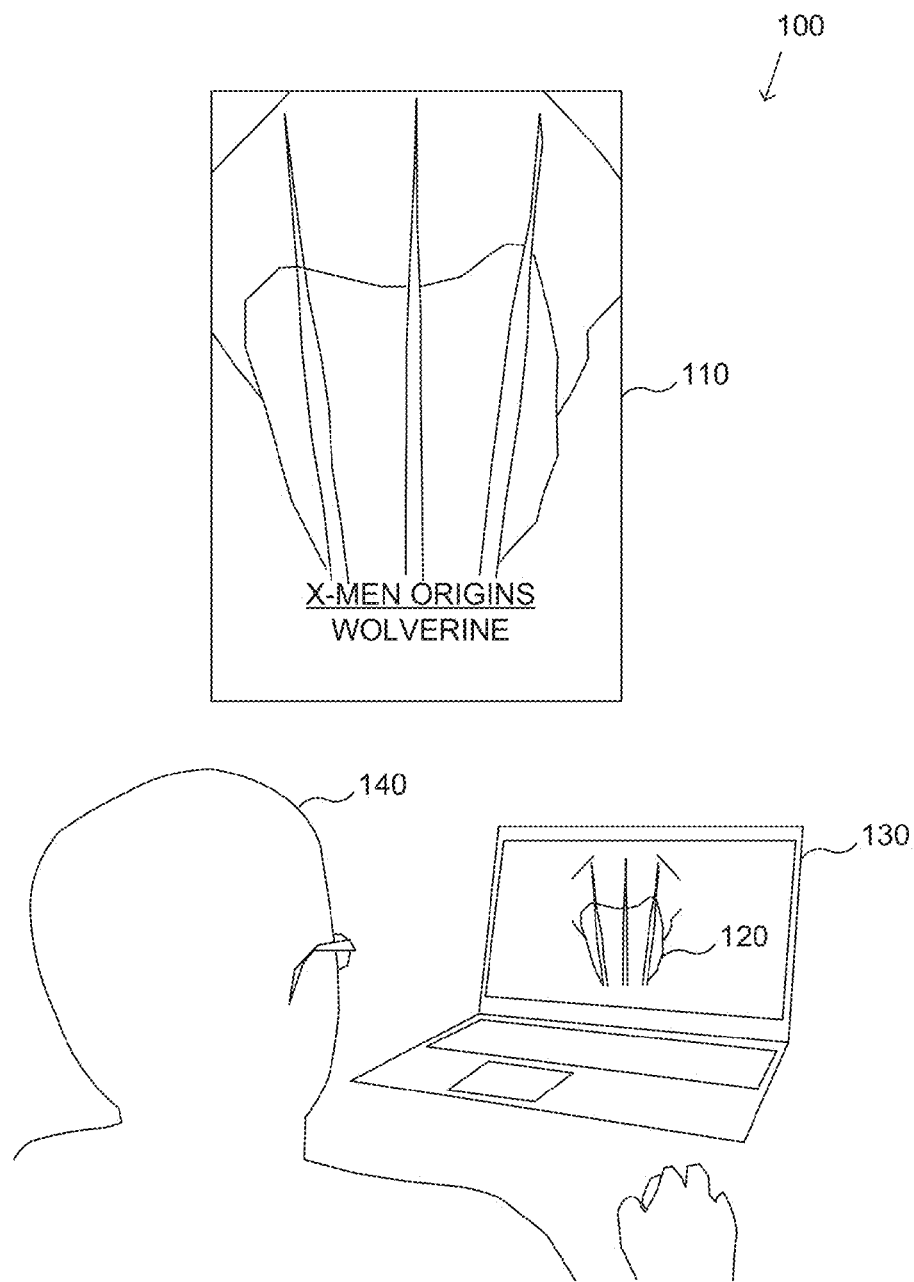
FIG. 1 is an illustration of pirated media being viewed online.

Referring to FIG. 1, an illustration depicts film media 110, a laptop computer 130, a pirated film 120, and a viewer 140. With the advent of the Internet, filestreams can be communicated in massive amounts with ease and efficiency to many users all around the world. Unfortunately, filestreams such as the pirated film 120, can be communicated illegally through underground networks comprising media viewers, such as media viewer 140. No sooner does a digital work become available for purchase then it becomes available illegally through peer to peer networks. In some cases intellectual property is leaked prior to its official release and made available to an increasingly tech-savvy populace. With robust watermarking protection, however, the pirated film 120 displayed on the laptop computer 130 and being viewed by the media viewer 140 could be detected and followed up with appropriate measures to address the problem.

Figure 2:
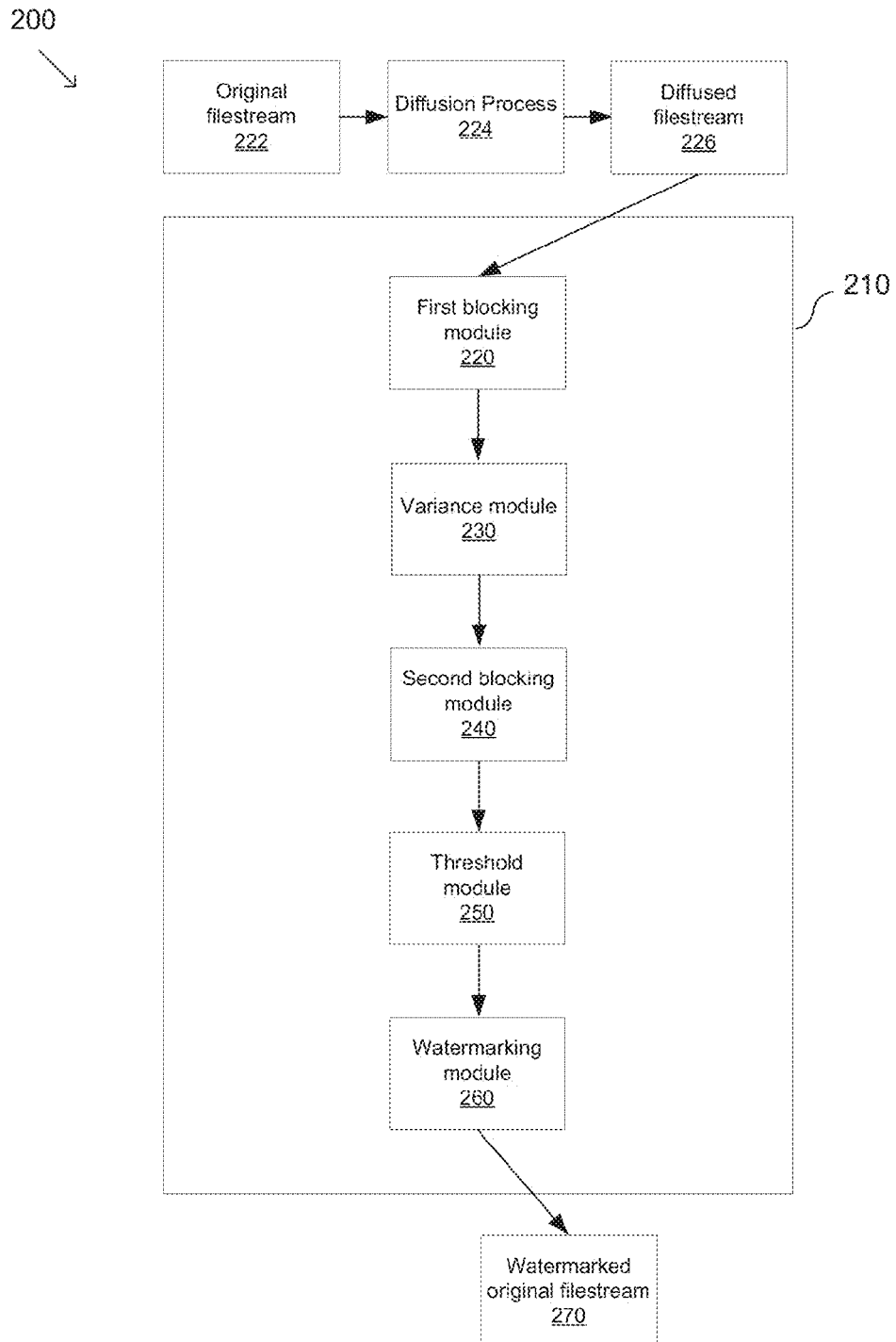
FIG. 2 is an illustration of a computer system that watermarks a filestream.

Now referring to FIG. 2, a watermarking system 200 illustrates the process by which a watermark may be embedded on media. The watermarking system 200 is shown comprising a computer system 210, a first blocking module 220, a variance module 230, a second blocking module 240, a threshold module 250, and a watermarking module 260.

In some embodiments, an original filestream 222 undergoes a diffusion process 224 to become a diffused filestream 226. For some types of media, such as an image, the diffusion process 224 may be anisotropic diffusion, or another type of non-linear filtering smoother that reduces the amount of noise in the original filestream 222 while still preserving the edges. Anisotropic diffusion is a non-linear filtering technique that uses the gradient of an image to determine how much of an effect the filtering will have on that portion of the image. As the gradient increases the effect of filtering decreases. There are two functions for the filtering coefficient which both go to zero as the gradient increases. There is also a scalar that determines how much the regions with a higher gradient are taken into account. The scalar value determines the extent to which an image is smoothed across high gradient regions.

The purpose of anisotropic diffusion is to reduce the amount of noise in a picture while preserving the edges, thus preserving consistent perceptual similarity. In other words, it identifies which regions can be modified without noticeably changing how it would be recognized. Altering the information bearing features identified by the diffusion will produce an image that will be noticeably different from the original image, hence the areas with those features can be seen as essential to media file integrity. Therefore, certain embodiments presented herein identifies these areas in the diffused media and then embeds information in them such that the embedded information is not detectable by a human, yet is recoverable using a detection algorithm.

Instead of anisotropic diffusion, other types of processes may be used that similarly reduce the amount of noise in the filestream 222 while preserving perceptual consistency. This type of process is useful because the unaltered portions of the diffused filestream 226 may be deemed essential to media file integrity for purposes of the watermarking system 200 embodiments. Consequently, embodiments of the system 200 may identify these unaltered portions and embed them with information such that the new information is not detectable by a human and yet still recoverable using a detection algorithm.

Upon receiving the diffused filestream 226, the computer system 210 divides the diffused filestream 226 into a first set of data blocks in the first blocking module 220. Each block comprises a region of the diffused filestream 226. The region may vary in size and dimensions. Factors that influence the type of regional selection may include the size of the filestream or the smoothing results obtained by the initial diffusion. Other factors may also influence the type of regional selection.

Once the first set of data blocks is obtained, the variance module 230 calculates the variance of the first set of data blocks. The variance calculated by the variance module 230 represents the total variation of salient features or properties of the diffused filestream 226. This is accomplished by performing a variance calculation for each region in each data block. For example, for an image comprising pixels, the variance module 230 calculates the amount of variation in each pixel in each data block. To calculate the amount of variation of the pixel, the pixel is compared to its immediate neighboring pixels and the difference in one or more properties is calculated. The difference may then be amplified by a predetermined intensity function. The difference calculation is performed for each pixel in each data block. The total variation for each data block is then stored in a matrix. The total variation of a data block for some embodiments may be represented by the following equation:

$$V = \sum_{i \in block} \sum_{j \in N(i)} (x_i - x_j)^k$$

where x is a feature to be compared, N(i) comprises j neighboring pixels of pixel i, and intensity factor k>0.

The variation matrix may attain very large values which may prove unwieldy. Therefore, certain embodiments may normalize the matrix by its largest entry to provide a more practical framework. For example, the normalization may produce values between 0 and 1 where each entry represents the amount of variation for a specific data block. This matrix may be referred to as a bitmap, and may be useful when selecting a location for inserting a watermark.

Upon creating a variation matrix in the variance module 230, the first set of data blocks is ordered into a second set of data blocks by the second blocking module 240. This may be accomplished by grouping data blocks from the first set of data blocks by a certain criterion. For example, data blocks may be grouped according to a block of space that houses a specific group of data blocks. This block of space may be rectangular, square, etc. Furthermore, each grouping may have the same space and shape. Alternatively, the grouping may have a different space and shape. There also may be a random grouping and shape.

Each data block of the second set comprises one or more data blocks from the first set of data blocks. Using the corresponding entries in the variation matrix, a determination will be made as to whether the larger block has sufficient information payload to allow for a watermark. This is done by summing the entries of the variation matrix that correspond to a larger block and then only accepting those blocks that are above an arbitrary threshold.

Using corresponding entries in the variation matrix, the threshold module 250 determines whether each data block of the second set meets a variation threshold level. Alternatively, the threshold module 250 may determine whether only one data block, a random assortment of data blocks, or an isolated number of data blocks meet the variation threshold level. If a data block of the second set meets or exceeds the variation threshold level, the data block is considered to be a threshold data block, meaning that it may receive a watermark.

To identify a threshold data block, the threshold module 250 sums the entries of the variation matrix that correspond to each data block of the second set. The sum of the entries for a given data block of the second set may meet or exceed a variation threshold value. The variation threshold value may be pre-selected. Alternatively, the variation threshold value may be based on a number of data blocks desired to receive a watermark. For example, the 10 data blocks with the highest sums may be selected. Other selection criteria may also serve to select a certain data block or multiple data blocks of the second set to be a threshold data block, and thus receive a watermark.

With one or more data blocks selected by the threshold module 250 to be threshold data blocks, the watermarking module 260 may then embed one or more watermarks in the original filestream, producing a watermarked original filestream 270. Specifically, the region of the watermarked original filestream 270 lies in the same region of the threshold data block in the diffused filestream. Thus, it is the regional information of the data block that is used to embed the watermarks in the original filestream.

In some embodiments, one or more portions of the components or modules shown in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the variance module 230 can be, or can include, a software module configured for execution by at least one processor (not shown). Similarly, one or more portions of the watermarking module 260 can be a software module configured for execution by at least one processor (not shown). In some embodiments, the functionality of the components can be included in different modules and/or components than those shown in FIG. 2. For example, although not shown, the functionality of the variance module 230 can be included in a different module than the variance module 230, or divided into several different modules.

In embodiments, the data block from the second set may be marked with a watermark by increasing the variation of the one or more data blocks that make up the data block of the second set in proportion to their respective original variation. Altering the variation of the one or more data blocks may be accomplished in many ways. In some embodiments, the light pixels may be made brighter without altering the dark pixels. More sophisticated techniques may provide a more robust watermark.

In some embodiments, encoded information contained within the watermark may be used in a conventional bitstream. For example, if a data block has a watermark containing increased variation, a value of 1 may be registered. On the other hand, if there has been little or no change, a value of 0 may be read. In this manner, a conventional bitstream may be encoded which will allow for error correction and conventional interpretation for the entire image. Similarly, watermarks contained in filestreams with other types of digital media may also be used to generate a bitstream.

Figure 3:
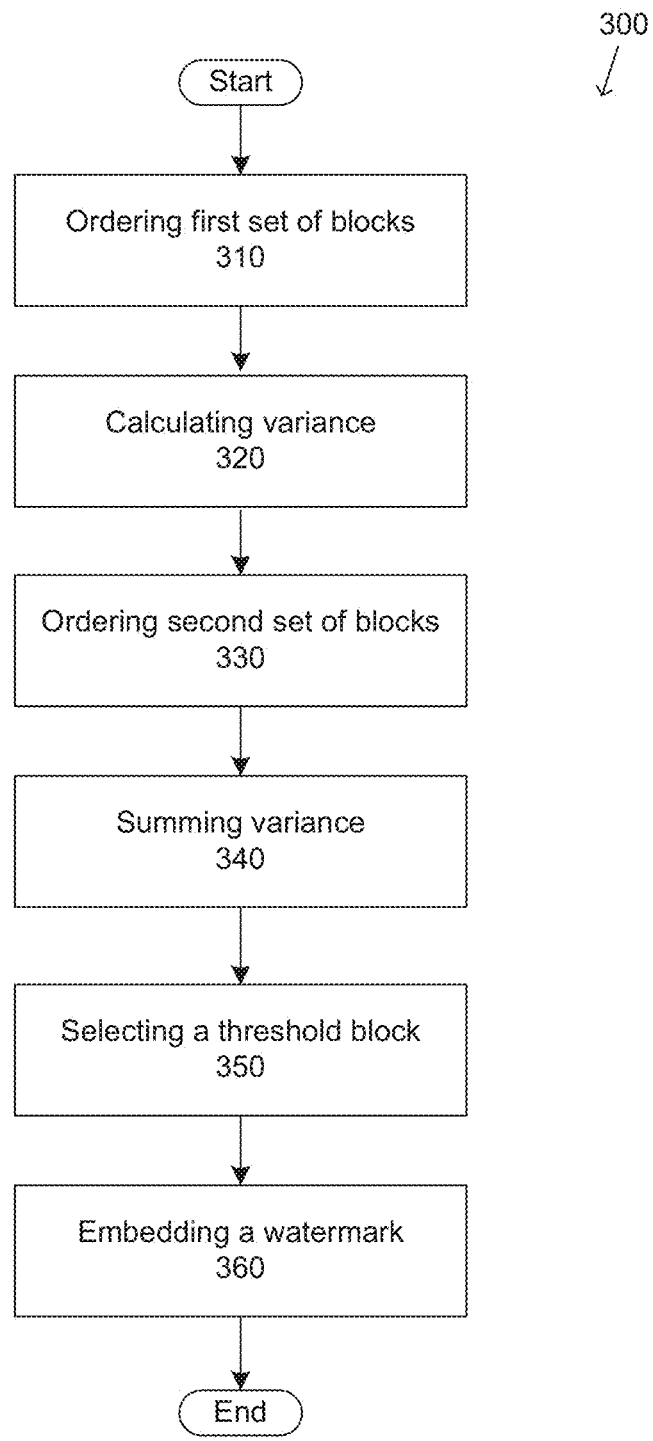
FIG. 3 is a flowchart diagram depicting the method used to watermark a filestream.

As depicted in FIG. 3, a watermarking method 300 includes ordering a first set of blocks 310, calculating variance 320, ordering a second set of blocks 330, summing a variance 340, selecting a threshold block 350, and embedding a watermark 360.

Figure 10:
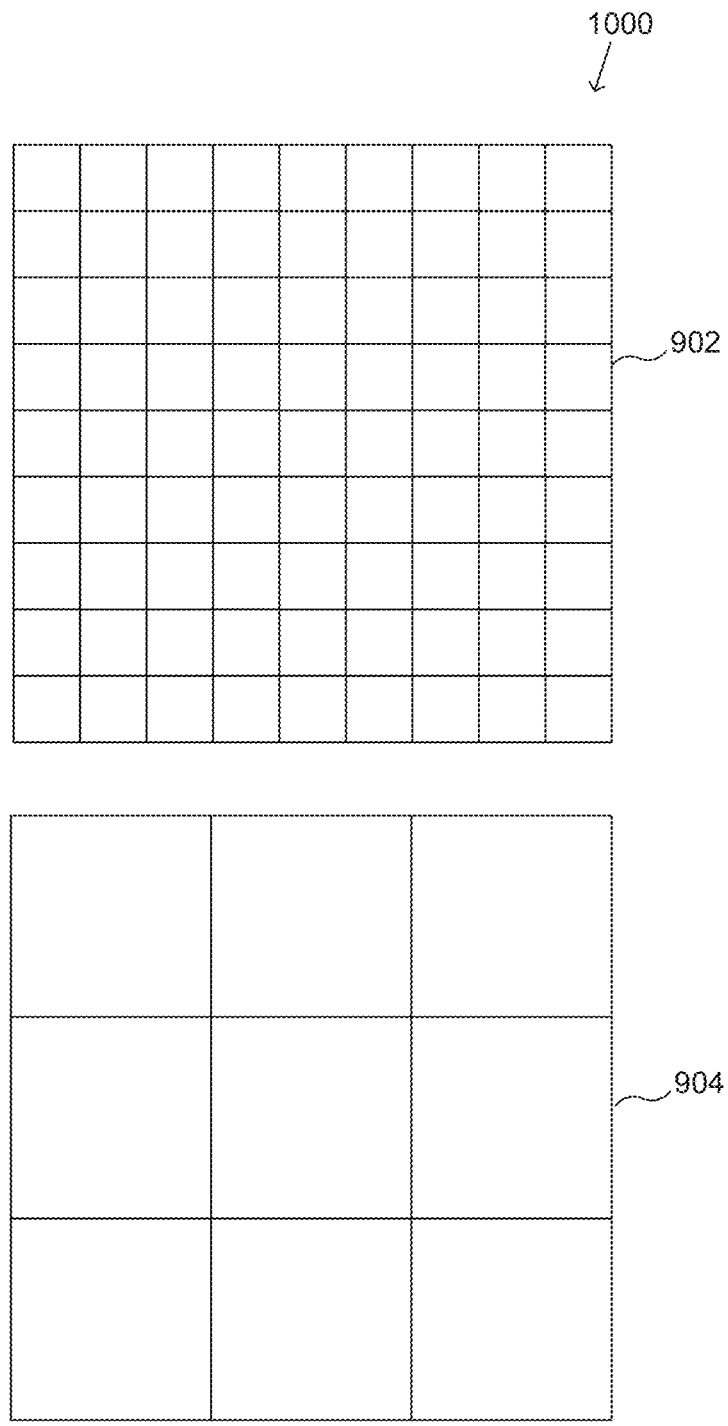
FIG. 10 is an illustration of a first and second data block.

Ordering a first set of blocks 310 may include ordering a diffused filestream into a first set of blocks wherein each block comprises a region of the diffused filestream. Refer to FIG. 10 for a depiction of ordering a first set of blocks as used in certain embodiments. As pointed out earlier, the region may vary in size and dimension. Also, unique factors of the filestream may be used to determine the regions selected.

Following the ordering 310, calculating variance 320 of the ordered first set of blocks may include calculating the amount of variation for each pixel per block. This calculation may further include comparing each pixel with its immediate neighboring pixels to determine a value that represents the difference. This calculation may further include amplifying the difference by a predetermined intensity function. Summing the difference or the amplified difference for each individual pixel contained within the first set of blocks yields a value that may then be stored as an entry in a matrix, along with other values for other blocks within the first set. Each entry represents the variation intensity for the corresponding pixel. Each entry may also be normalized with the largest entry in the variation matrix. For digital media that does not include pixels, the data type may be determined by the given digital media.

Ordering a second set of blocks 330 includes ordering the first set of data blocks into a second set of data blocks, wherein each data block of the second set comprises one or more data blocks of the first set. In some embodiments, the dimensions for the data block of the first set may be represented as k by k, where k represents the number of pixels. The dimensions for the data block of the second set may be represented by N by N, where the relationship between k and N is given by $N^2$=k. Other relationships may also exist between first and second set of data blocks.

Summing variance 340 includes summing the entries of each data block of the first set for each data block of the second set. Selecting a threshold block 350 includes selecting a threshold data block that is a recipient of a watermark. If a data block of the second set meets or exceeds the variation threshold level, the data block is considered to be a threshold data block.

Embedding a watermark 360 includes embedding a watermark in a region of the original filestream that has the same region as the threshold data block in the diffused filestream. In preserving unique aspects of the original filestream, embodiments are advantageous over previous systems and methods that provide a watermark in a diffused or otherwise modified filestream.

Figure 4:
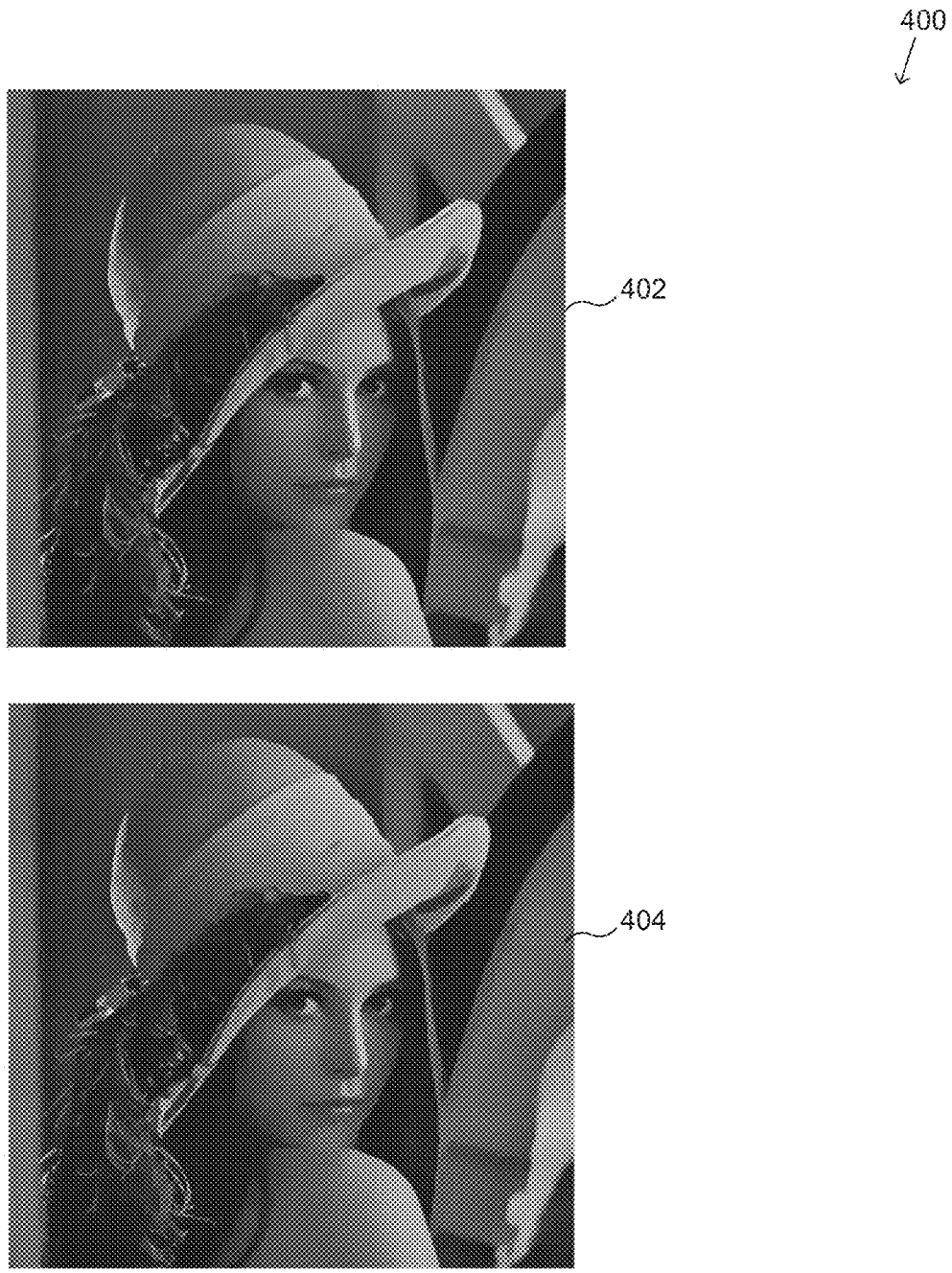
FIG. 4 is an illustration that depicts an original image side by side a watermarked image.

FIG. 4 provides an image juxtaposition 400 of a Lena image 402 and a watermarked Lena image 404. The Lena image 402 is a common test image used for image processing algorithms. After receiving a watermark via embodiments presented herein, the watermarked Lena image 404 is virtually unchanged from the unmarked Lena image 402, the changes being undetectable to the human eye.

Figure 5:
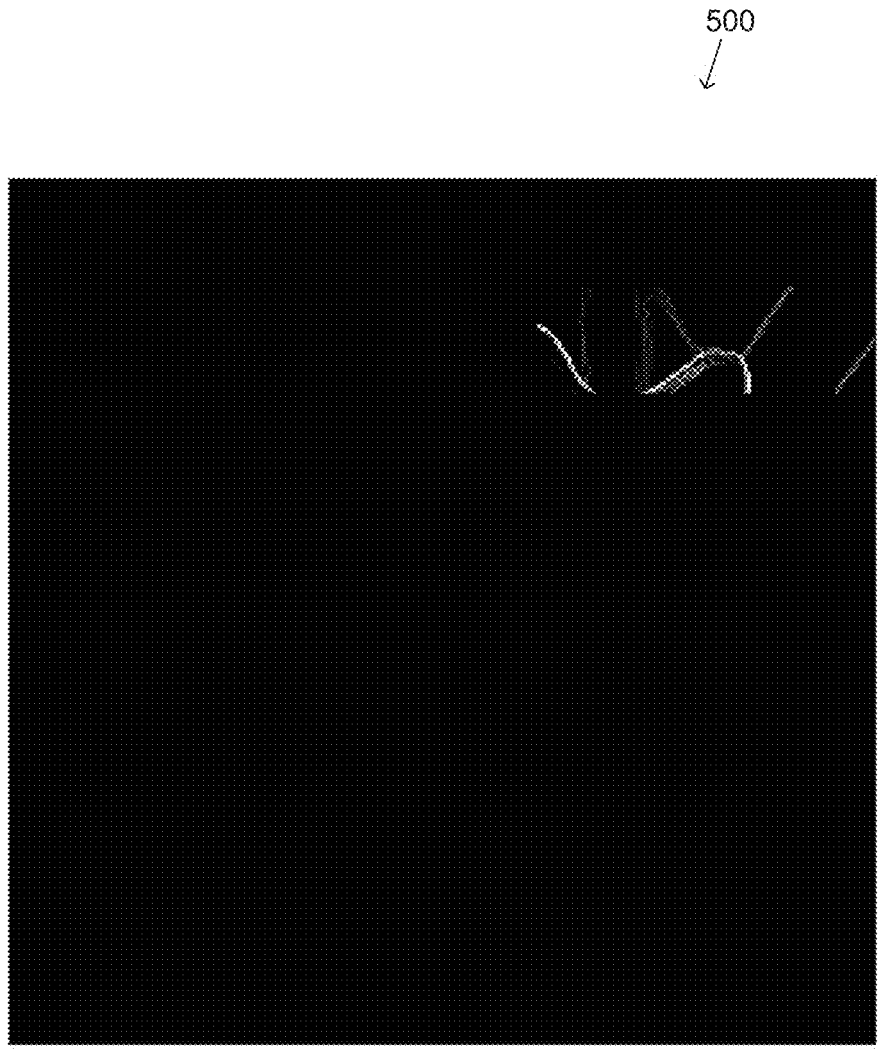
FIG. 5 is an illustration of the blocking process on a filestream.

FIG. 5 depicts a comparison image 500 of the two images shown in FIG. 400, namely, the difference found when the Lena image 402 overlays the watermarked Lena image 404 and the common aspects of the two images are removed. The difference demonstrates the location where the watermark has been inserted. The white lines follow part of Lena's hat, while the gray lines follow contrasting lines of the background image. The lines also demonstrate regions that have sufficient threshold data associated with them to have thus enabled them to receive a watermark.

Figure 6:
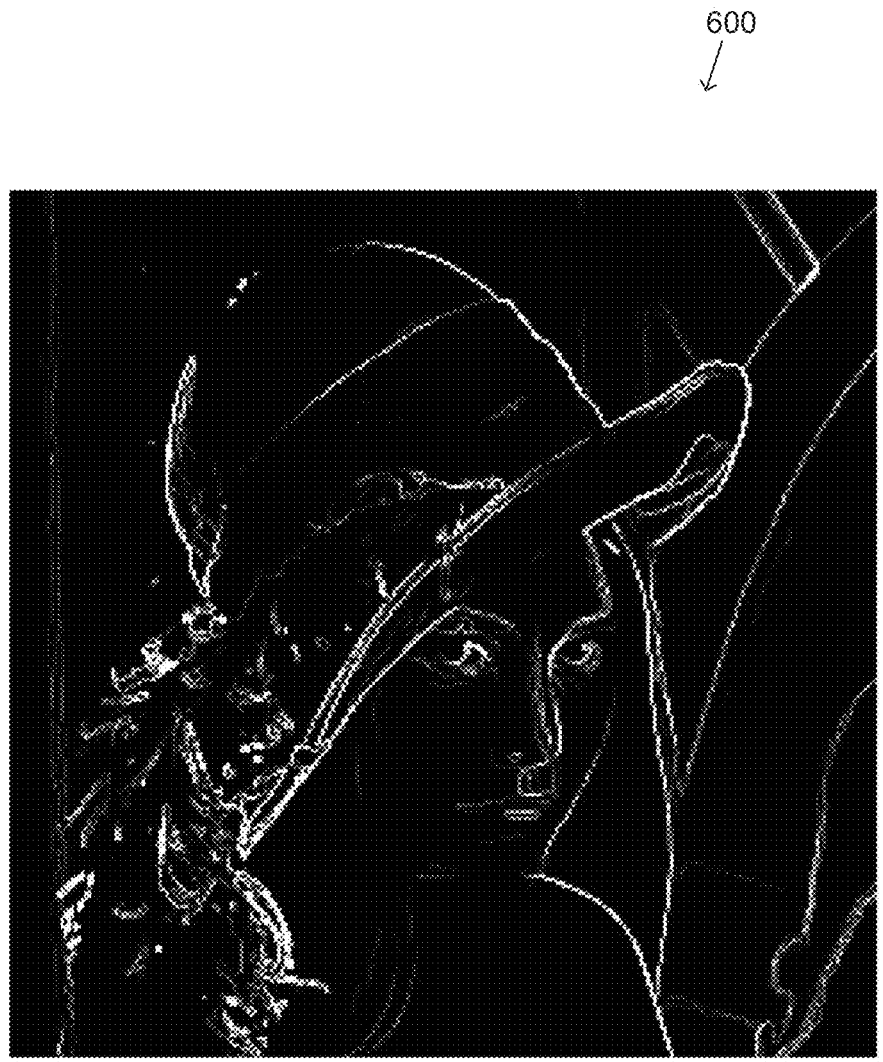
FIG. 6 is a visual representation of the variation matrix, the lighter areas demonstrating areas registering high variation.

FIG. 6 depicts a variation matrix image 600. The white and gray lines represent areas with high variation.

Figure 7:
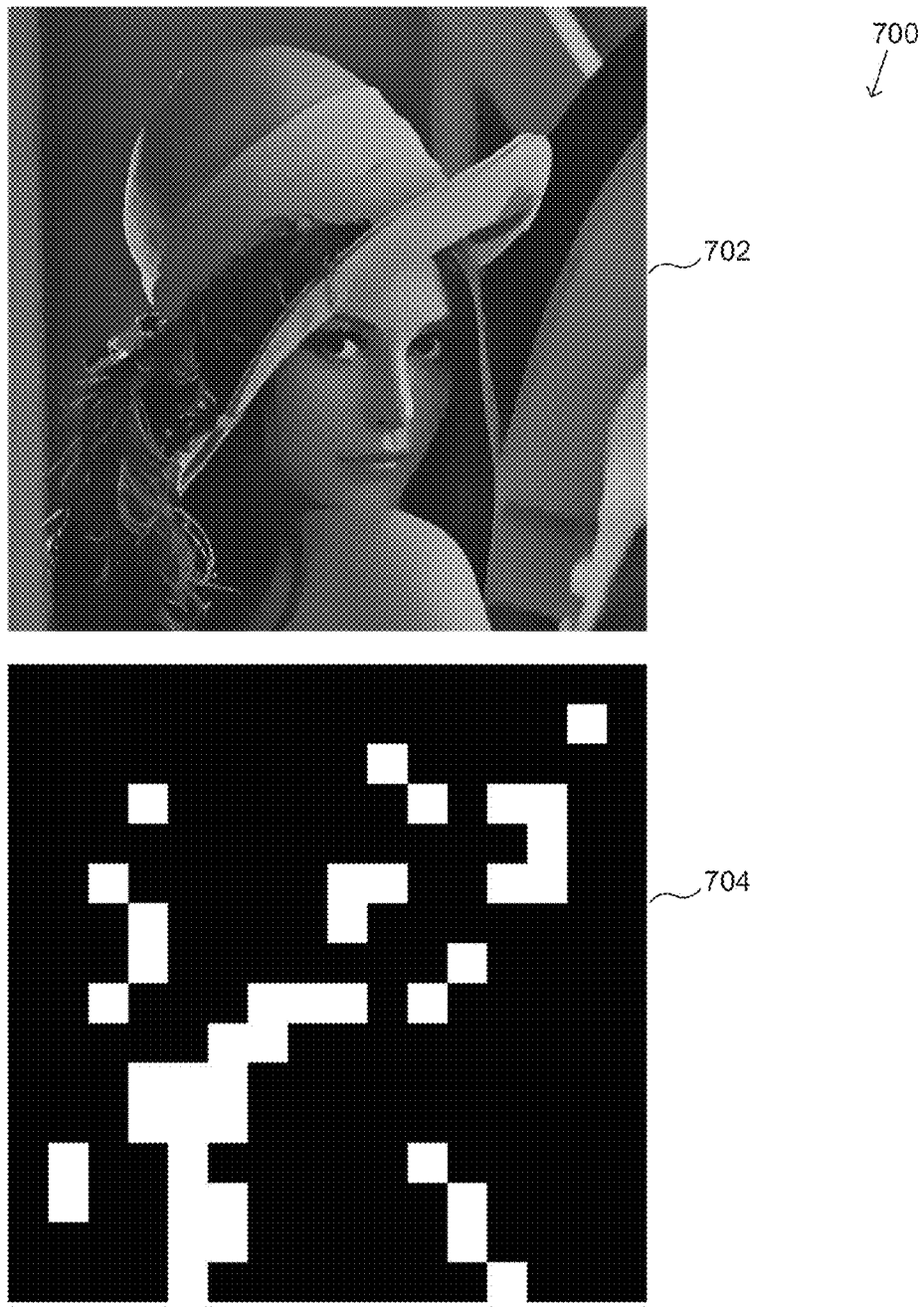
FIG. 7 is a block diagram of the original image with white squares representing data blocks with high variation.

FIG. 7 is an image juxtaposition 700 of a Lena image 702 with a data block image 704, the data block image 704 comprising white squares that represent areas of the Lena image that have high variation, areas that are also suggested by the lines of high variation as shown in FIG. 6. A preliminary threshold value can be set to determine what constitutes high variation. Alternatively, a predetermined number of blocks with the highest variation can be selected. What constitutes high variation can be predefined or selected in a dynamic way according to a unique set of information data. Variation values, as discussed earlier, can also be amplified and normalized to make the numbers more manageable and which aid in discerning variation.

Figure 8:
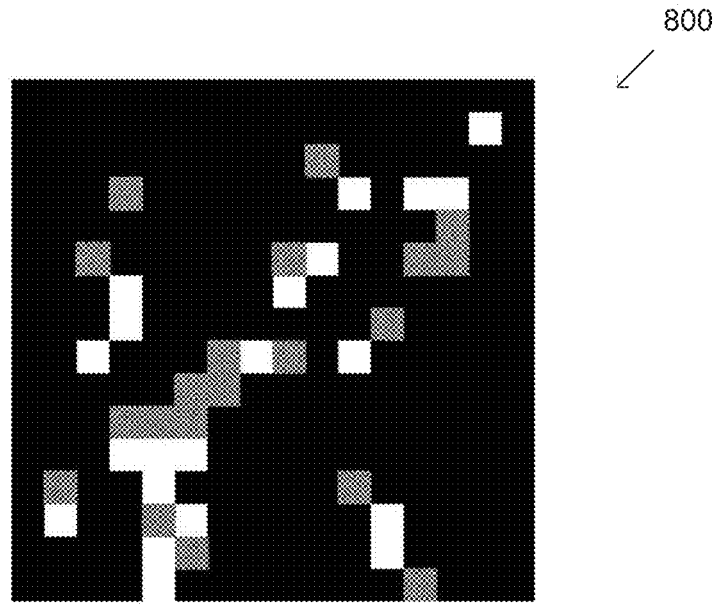
FIG. 8 is a block diagram of the original image with the high variation squares in FIG. 7, but with gray squares representing blocks that will be embedded with a watermark, and white squares representing watermark block candidates that will not be embedded with watermarks.

FIG. 8 depicts another data block image 800 of the Lena image 702 from FIG. 700, the data block image 800 comprising gray squares that represent areas of the Lena image that will receive a watermark and white squares that represent areas that will not receive a watermark. The gray squares represent threshold data blocks, meaning that they exceed the variation threshold level. The bitmap generated for watermarking may, for example, indicate a threshold data block with a 1 and the remaining blocks with a 0. In some embodiments, the watermark may then be embedded by increasing the local variation of the threshold data block indicated with a 1.

Figure 9:
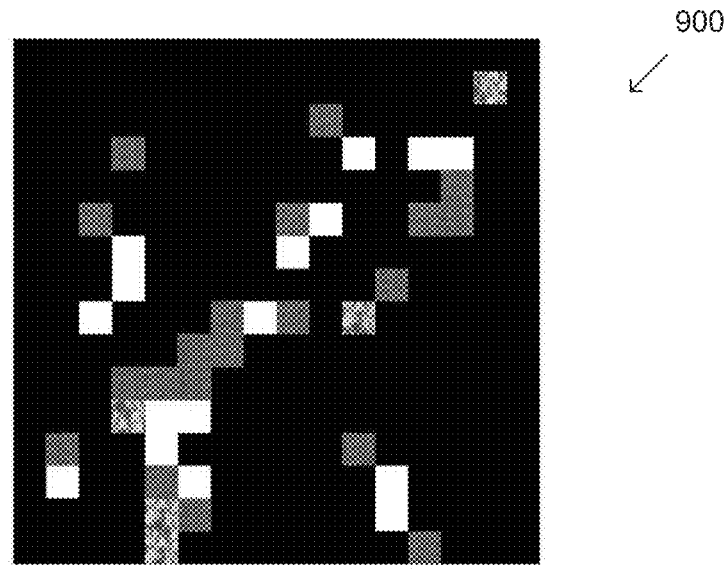
FIG. 9 is a block diagram of the original image with the high variation squares in FIGS. 7 and 8, further having received watermarks and then having undergone a detection process such that dark gray blocks represent blocks found to have a correctly embedded watermark, white blocks found to have a correctly omitted watermark, and the gray/white blocks found to be in error.

FIG. 9 is a block diagram of the original image after having received watermarks and then having undergone a detection process such that dark gray squares represent blocks found to have a correctly embedded watermark, white squares represent blocks found to have a correctly omitted watermark, and the gray/white squares represent blocks where an error occurred. One example of a detection process involves attacking an image with a watermark by applying anisotropic diffusion to the watermarked image. Alternatively, or in conjunction with anisotropic diffusion, the attack may comprise another application that modifies the watermarked filestream. Then, the original image is subtracted from the attacked image and searched for high remainder areas. Other tests, such as, Gaussian blur and total variation minimization filters, may also be used to attack the image. The presence of false positives can be compensated for with standard error correction techniques.

The presence of false positives may be corrected with standard error correction techniques. Techniques that may be used to attack an image including Gaussian blur and total variation minimization filters. The method used—simply subtracting the original image form the attacked image and searching for high remainders—may also be corrected by using more sophisticated techniques that produce more precise measurements. Robustness to attacks may also be shown to a watermarked image that has been resized, resampled, and reformatted. For example, a watermarked image that has had a drop in resolution, been reformatted, and then resampled to a higher resolution may have the embedded watermark remain detectable.

FIG. 10 depicts an example of using total variation techniques introduced herein. A first set of data blocks 902 and a second set of data blocks 904, are shown as they may be used in certain embodiments described herein. Upon receiving the diffused filestream 226, as discussed regarding FIG. 2, the computer system 210 divides the diffused filestream 226 into a first set of data blocks. Each block comprises a region of the diffused filestream 226. The first set of data blocks 902 is represented by a grid of squares. The data blocks may come in other shapes and sizes; furthermore, each block may be unique and some blocks may be different than other blocks. The data block may be predetermined, or it may be dynamically determined based on an initial handling of the data. For each data block, represented by a square, a variance will be determined. This value may be used by itself or it may be modified. For example, it may be amplified and normalized.

A second set of data blocks 904 is represented by the grid of larger squares. Each block, or square, in the second set of data blocks 904, is made up of a group of blocks, or squares, from the first set of data blocks 902. Thus, the total variance of each larger block, or square, is determined by summing the variance for each smaller block, or square, that makes up the larger block. The data blocks of the second set that meet a given variance threshold will then be selected to receive a watermark in their respective first set of data blocks. Thus, the concept of total variation can be used to determine regions of a filestream that are candidates to receive watermark information.

In contrast to total variation, common methods available in the industry employ gradient measurement techniques. Gradient measurement techniques, however, are restricted to very small watermarks, making them susceptible to removal filters. Furthermore, gradient measurement techniques often select poor watermark locations, but which appear to be good based on the strong gradient found in those locations by the gradient measurement techniques. In contrast to gradient measurement techniques, certain embodiments that use total variation techniques superiorly place no restrictions on watermark size while also providing a strong watermark location to make the watermark robust.

For example, in the case of a filestream containing image information, gradient measurements are used to then define candidate blocks to receive watermarks. Thus, it is conceivable that a single pixel be the candidate to receive the watermark should gradient measurement techniques be employed. If such a watermark is attacked with a smoothing filter or other noise-removing technique, the embedded information could easily vanish. In contrast, total variation techniques pre-define blocks and then select which blocks are strong candidates for watermarking. Total variation techniques thus identify a more suitable block size of pixels to receive watermarks, improving the size, location, and ultimately, the robustness of the watermark.

Another distinction is that while previous methods of watermarking may have a pre-determined nature, certain embodiments of total variation techniques may make dynamic decisions. For example, previous methods may have a maximum number of data stream values that can be altered, as well as a predetermined amount of distortion that can be introduced to the data stream. Total variation techniques, on the other hand, may dynamically determine how much of the data stream is capable of robustly holding embedded information and then embed information based on the variation that already exists within a block in the data stream. Hence, it may be possible for every block of the data stream to hold embedded information, with the amount of distortion selected dynamically for each block. In conjunction, a uniform signal would not contain enough variation to hold any variation and would be rejected as "not-watermarkable."

While previous methods being used work in tandem with compression algorithms or other data processing techniques, certain embodiments of total variation techniques may work without relying on any compression algorithms, thus embedding watermarks only on the original data stream itself.

Furthermore, previous methods may use a secret, pre-shared data key in order to identify embedding location. Without this pre-shared key, recovering the watermark is designed to be difficult or impossible. A pre-shared key, however, is not required to identify embedding locations that have been determined with total variation techniques. Rather, the original image can be used to compare the watermarked image to find image locations that have been altered and which are thus possible watermarked locations. This is common to all robust watermarking techniques, as the dissemination of the original signal negates any possibility of effective watermark usage.

While previous methods can be considered fragile, embodiments of total variation techniques are designed to embed robust ownership information into a digital file. This is accomplished by leveraging areas of high variation not only because they are most likely to unnoticed by the human visual system (HVS) if altered, but also because lossy compression algorithms and filters that could be used to attack the watermarked data stream will tend to ignore those same areas in order to preserve the usefulness of the data stream.

FIG. 11 shows a sample pseudocode 1100 that may be used in certain embodiments to embed a watermark in an image that is made up of pixels. Variations of this pseudocode and the following pseudocodes may be adapted for watermarking other types of data. First, an image and its diffused image is stored. Second, a matrix of variation values for blocks of the image is created. The blocks include a first and second set of data blocks, as described previously. Next, if the variation value for a given block meets or exceeds a variation threshold value, the pixels in the corresponding block of the original image receive a watermark. This step is repeated for each block, with the watermarked image returned at the end.

FIG. 12 shows a sample pseudocode 1200 that may be used to perform a variance calculation for a given data block that is made up of pixels. Other types of data may be used, as described previously. The pseudocode takes and returns a measurement of the variation value for the data block. To accomplish this, a summation of the amount of variation for each pixel in each data block is found. To calculate the amount of variation for a given pixel, the pixel is compared to each of its immediate neighboring pixels and the difference between each of its immediate neighboring pixels in one or more properties is found and amplified by an intensity function. The total variation of the pixels for a given data block is then returned.

FIG. 13 shows a sample pseudocode 1300 that may be used to determine whether the blocks in the second set of data blocks meets or exceeds the variance threshold value. A true value is returned if a block meets or exceeds the variance threshold value and a false is returned if the block fails to meet or exceed the value.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

We claim:

1. A computer system including instructions recorded on a non-transitory computer-readable storage medium and readable by at least one processor, the system comprising:
    a first blocking module configured to divide a diffused filestream into a first set of data blocks, wherein each data block of the first set of data blocks includes a region of the diffused filestream and each data block of the first set of data blocks includes a plurality of pixels;
    a variance module configured to calculate the variance of the first set of data blocks;
    a second blocking module configured to order the first set of data blocks into a second set of data blocks, wherein each data block of the second set includes a plurality of data blocks of the first set;
    a threshold module configured to sum the variance of the second set of data blocks and to select a threshold data block, wherein the threshold data block is a data block within the second set of data blocks that has a variance at or above a set variation threshold level; and
    a watermarking module configured to embed a watermark in an original filestream from which the diffused filestream was derived, wherein the region of the watermark in the original filestream is in the same region of the threshold data block of the diffused filestream.

2. The system of claim 1, wherein the diffused filestream includes a filestream diffused by anisotropic diffusion.

3. The system of claim 1, wherein the region of each data block of the second set of data blocks if of a uniform size and shape.

4. The system of claim 1, wherein the variance module is configured to calculate the variance by summing a variation for each pixel within each data block of the first set of data blocks.

5. The system of claim 4, wherein the variation for each pixel is determined by summing a difference between each pixel and at least one immediate neighboring pixel within each data block of the first set of data blocks.

6. The system of claim 5, further comprising an amplification module that amplifies the difference by an intensity function.

7. The system of claim 4, wherein the variance for each data block of the first set of data blocks is normalized.

8. The system of claim 1, wherein the second set of data blocks includes a quantity of data blocks equal to the square root of a quantity of the first set of data blocks.

9. The system of claim 1, wherein the watermark of the threshold data block comprises increased variation in the data blocks of the first set within the threshold data block in proportion to the original variation.

10. The system of claim 1, further comprising an encoding module configured to encode original variation and increased variation of the data blocks within a bitstream.

11. A computer-implemented method for using the processor to execute instructions recorded on a computer-readable storage medium, the method comprising:
    dividing a diffused filestream into a first set of data blocks, wherein each data block includes a region of the diffused filestream and each data block includes a plurality of pixels;
    calculating the variance of the first set of data blocks;
    ordering the first set of data blocks into a second set of data blocks, wherein each data block of the second set includes a plurality of data blocks of the first set;
    summing the variance of the second set of data blocks;
    selecting a threshold data block, wherein the threshold data block is a data block within the second set that has a variance at or above a set threshold level; and
    embedding a watermark in an original filestream from which the diffused filestream was derived and in the same region of the threshold data block of the diffused filestream.

12. The method of claim 11, further comprising diffusing the filestream using anisotropic diffusion.

13. The method of claim 11, further comprising selecting the region based on uniform size and shape.

14. The method of claim 11, wherein summing the variance of each data block of the first set of data blocks includes summing a variation for each pixel within each data block of the first set of data blocks.

15. The method of claim 14, wherein summing the variation for each pixel includes summing a difference between each pixel and at least one immediate neighboring pixel within each data block of the first set of data blocks.

16. The method of claim 15, further comprising amplifying the difference by an intensity function.

17. The method of claim 14, further comprising normalizing the variance for each data block of the first set of data blocks.

18. The method of claim 11, further comprising selecting the second set of data blocks to include a quantity of data blocks equal to the square root of a quantity of the first set of data blocks.

19. The method of claim 11, further comprising embedding the watermark of the threshold data block to include increasing variation in the data blocks of the first set within the threshold data block in proportion to the original variation.

* * * * *